US006804709B2

(12) United States Patent
Manjure et al.

(10) Patent No.: US 6,804,709 B2
(45) Date of Patent: Oct. 12, 2004

(54) SYSTEM USES TEST CONTROLLER TO MATCH DIFFERENT COMBINATION CONFIGURATION CAPABILITIES OF SERVERS AND CLIENTS AND ASSIGN TEST CASES FOR IMPLEMENTING DISTRIBUTED TESTING

(75) Inventors: Samir B. Manjure, Redmond, WA (US); Anthony M. Leibovitz, Sammamish, WA (US); Rajesh R. Peddibhotla, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 821 days.

(21) Appl. No.: 09/788,772

(22) Filed: Feb. 20, 2001

(65) Prior Publication Data

US 2002/0116507 A1 Aug. 22, 2002

(51) Int. Cl.[7] .............................................. G06F 15/177
(52) U.S. Cl. ........................ 709/220; 709/228; 702/123
(58) Field of Search ................................ 709/220, 228, 709/203, 224, 222; 702/123; 718/101; 370/285; 717/101; 716/4

(56) References Cited

U.S. PATENT DOCUMENTS

| | | | | |
|---|---|---|---|---|
| 5,703,788 A | * | 12/1997 | Shei et al. ....................... | 716/4 |
| 5,819,043 A | * | 10/1998 | Baugher et al. ............ | 709/222 |
| 6,260,065 B1 | * | 7/2001 | Leiba et al. ................. | 709/224 |
| 6,330,602 B1 | * | 12/2001 | Law et al. ................... | 709/224 |
| 6,333,931 B1 | * | 12/2001 | LaPier et al. ............... | 370/385 |
| 6,519,763 B1 | * | 2/2003 | Kaufer et al. ............... | 717/101 |
| 6,742,015 B1 | * | 5/2004 | Bowman-Amuah ......... | 718/101 |

OTHER PUBLICATIONS

Salvator, Salamone, "*Ensuring That VPN Tunnels Can Interoperate,*" Internetweek, 1998, N. 717, p. 17.

Kang, Taewoon et al., "*Design and implementation of A–monitor for ATM Protocol Monitoring and Analysis,*" Australian Telecommunication Networks & Applications Conference 1994, vol. 1, pp. 267–269.

P. Brand et al., "*Complete Test System for testing ISDN Signalling Protocols,*" ISS 1992, Oct. 1992, vol. 2, pp. 454–458.

Bushby, Steven T. "*Testing the Conformance and interoperability of BACnet Systems,*" ASHRAE Journal, vol. 38, No. 11, Nov. 1996.

(List continued on next page.)

Primary Examiner—Le Hien Luu
(74) Attorney, Agent, or Firm—Leydig, Voit & Mayer, Ltd.

(57) ABSTRACT

A system and method for testing the implementation of a remote access protocol in network servers and/or clients goes through test cases with different server-client configuration combinations in an automated and distributed process. The testing system includes at least one test controller, a client pool, a server pool, and a database that maintains the test cases to be tested. Servers and clients participating in the distributed testing are registered with the test controller, which matches a server with a client based on their configuration capabilities and/or other factors. Test cases selected from the database are then assigned to the server-client pair for execution. For each assigned test case, the client assumes the client configuration of that case and calls the server to establish a connection under the remote access protocol, and the server assumes the server configuration test results for the executed test cases are stored for monitoring and generating reports.

24 Claims, 4 Drawing Sheets

OTHER PUBLICATIONS

C, Feng et al., "*Captionals: A computer Aided Testing Environment for the Verification and Validation of Communication Protocols*", National Aeronautics and Space Administration, Washington DC, Oct. 30, 1992, pp.. 22.

O. Monkewich., "*SDL–based Specification and Testing Strategy for Communication Network Protocols*", Conference SDL 99 The Next Millennium, Proceedings of the Ninth SDL Forum, p. 123–134, 1999.

* cited by examiner

SYSTEM USES TEST CONTROLLER TO MATCH DIFFERENT COMBINATION CONFIGURATION CAPABILITIES OF SERVERS AND CLIENTS AND ASSIGN TEST CASES FOR IMPLEMENTING DISTRIBUTED TESTING

TECHNICAL FIELD OF THE INVENTION

This invention relates generally to computer networks, and more particularly to the testing of an implementation of a remote access protocol, such as the Point-to-point Protocol, in network servers and/or clients.

BACKGROUND OF THE INVENTION

Computer networking is a quite complicated subject matter, especially in the context of remote access services, as it often involves computers that are different on many levels and have different configurations and capabilities. For instance, two computers attempting to form a network connection may be running on different operating systems, use different sets of network connection media, and support different types of authentication. To enable different computers to establish communication connections with each other, a remote access protocol is used to allow two computers to agree upon how they should conduct subsequent communications over a network. An example of a remote access protocol is the Point-to-Point protocol (PPP), which is actually a set of industry standard protocols that enable remote access solutions to be incorporated in a multi-vendor network. Under the PPP, when a network client dials up (via modem or other media) to a server, they go through a negotiation process to agree upon the various protocols they will use for the subsequent communication, such as link control protocols, authentication protocols, network control protocols, etc.

The PPP is typically implemented in a remote access service (RAS) as part of an operating system that supports networking functionality. To ensure that the PPP has been implemented properly, the provider of the server software has to test the RAS with different combinations of server and client configurations to see whether connection attempts will succeed or fail as expected for the configuration combinations. A thorough testing of the PPP implementation, however, has been very difficult to manage and carry out. This is because of the extremely large number of different combinations of server and client configurations that may be encountered in real operations. The various attributes of a server, such as its compression mechanism, authentication protocol, encryption settings, authentication mechanism, network protocol settings, domain settings, and many other attributes, give rise to thousands of possible ways a server can be configured. A client likewise has an equally wide range of possible configurations. Moreover, the client may be running on one of many different operating systems with various system attributes enabled or disabled. Furthermore, the network connection between the server and the client may be over different media, such as modem, L2TP, PPTP, ISDN, etc. All these configuration variations of the server and the client can result in millions of possible combinations, and it can be a daunting task to test all, or even a selected portion, of those combinations.

For instance, if a tester is to manually set the configurations of the server and the client and initiate the connection process for each combination, the amount of time and efforts required to go through the combinations to be tested will be prohibitively large. If it takes two minutes on the average for a tester to reconfigure the server and client for each new combination, and only the most important one million combinations are to be tested, it would take over thirty thousand man-hours to perform the test. Prior to the invention, there has been no testing system or method available that enables automated testing of the implementation of a remote access protocol, such as the PPP, in network servers and/or clients, in a flexible, efficient, and controlled manner.

SUMMARY OF THE INVENTION

In view of the foregoing, the present invention provides a system and method for testing the implementation of a remote access protocol in network servers and/or clients that allows the numerous different combinations of server and client configurations to be tested in an efficient, controllable, and reliable way. In accordance with the invention, the testing of the protocol implementation is conducted in a distributed manner that involves one or more test controllers and multiple server computers and client computers. The different server-client configuration combinations to be tested, referred to as "test cases," are maintained in a database, which indicates whether a test case has been tested as well as the pass/fail results of executed test cases. When a server joins the pool of servers participating in the testing, it registers with an available test controller. Likewise, a client joining the client pool registers with the test controller. The test controller matches a client with a server based on their configuration capabilities and/or other factors, such as the type of test cases the server and the client want to execute. Selected test cases are obtained from the database and assigned to the server-client pair for testing. For each assigned test case, the client assumes the client configurations of the test case and initiates a call to the server to try to establish a connection under the remote access protocol being tested, and the server assumes the server configurations of the test case in responding to the client's call to establish a connection. The results of the executed test cases (i.e., whether the client was able to establish connections with the server) are reported for analysis and may be monitored by a user. After the assigned test cases are executed, the server may be paired with a different client, and vice versa, or new test cases may be assigned to the server and client for further testing.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
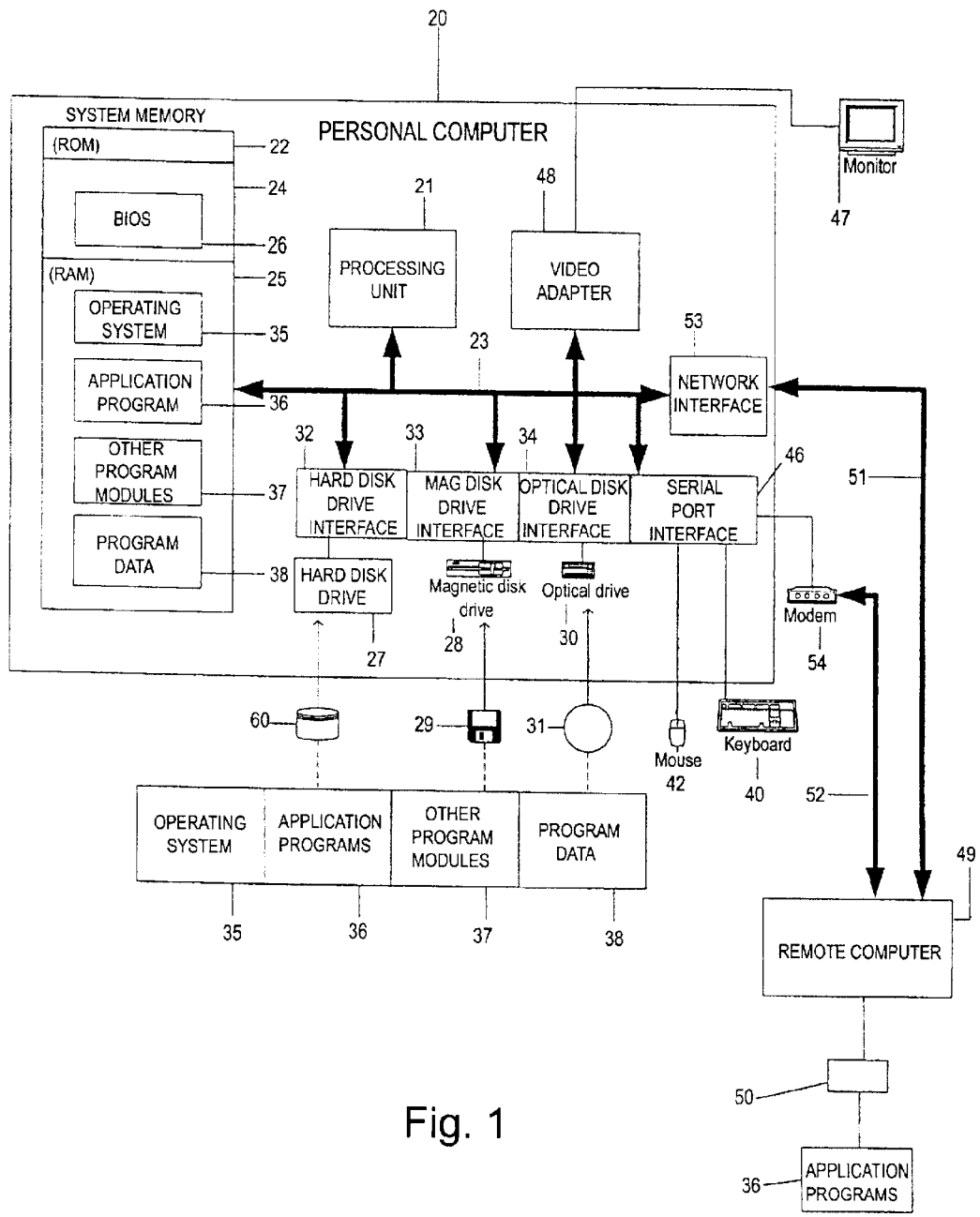
FIG. 1 is a block diagram generally illustrating an exemplary computer system on which the present invention may reside.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the invention will be described in greater detail with reference to FIGS. 2–4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
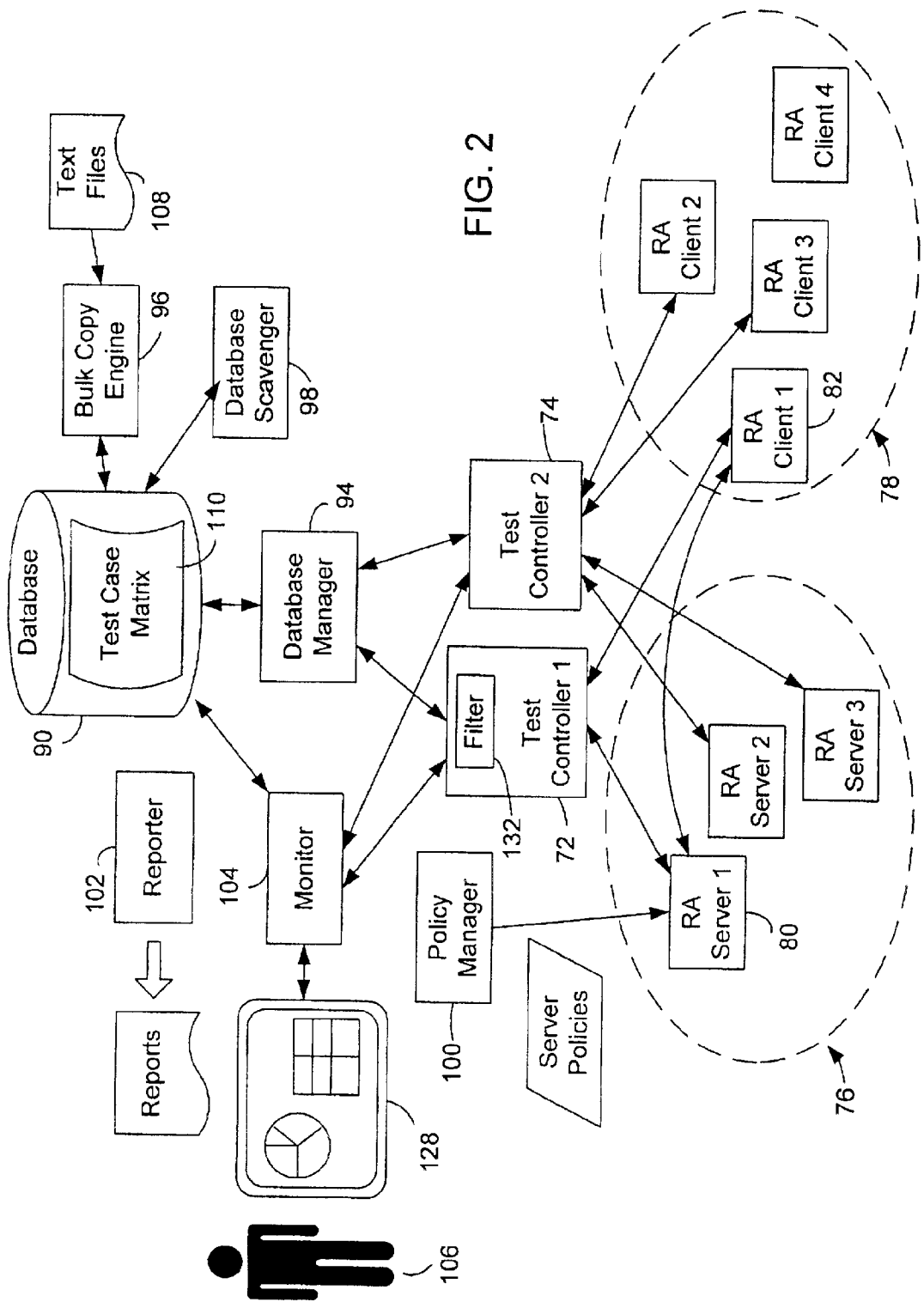
FIG. 2 is a schematic diagram showing an embodiment of a system for distributed testing of the implementation of a remote access protocol in a remote access service that employs at least one test controller and multiple servers and clients.

Referring now to FIG. 2, the present invention is directed to a system and method for performing distributed testing of the implementation of a remote access protocol in network servers and/or clients. Under a remote access protocol, attributes of the client relating to network connectivity in conjunction with such attributes of the server will govern whether access to the server will be granted to the client, i.e., whether the client is allowed to connect to the server. Examples of remote access protocols include, for instance, the Point-to-point Protocol ("PPP") and the Serial Line Internet Protocol ("SLIP"), etc. The system and method of the invention allows the various combinations of server and client configurations pertinent to the formation of a client-server connection under a remote access protocol to be tested in an efficient, controlled, and flexible manner.

The distributed testing system according to the invention includes one or more test controllers 72 and 74, a pool 76 of servers, and a pool 78 of clients. Each server participating in the testing is matched by a test controller with a client based on their configuration capabilities and other factors. The server-client pair is then assigned with a selected set of server-client configuration combinations for testing the connectivity under the remote access protocol. Such client-server configuration combinations pertinent to testing the implementation of the remote access protocol are referred to as "test cases." For instance, in the particular application of testing the PPP implementation in the RAS software, the relevant server and client attributes constituting the configuration combinations include the connection media, authentication protocol and mechanism, encryption, compression mechanism, network control protocol, link control protocol, domain policies, etc.

After receiving the assigned test cases, the client initiates calls to the server to go through the assigned test cases, and the success or failure of each test case is recorded and reported for analysis and/or monitoring by a user. After the assigned test cases are executed, new test cases may be given to the server and client for execution, or the server and client may be matched with other clients and servers for further testing.

The following description will focus on an embodiment of the invention used in the particular context of testing the implementation of the Point-to-point Protocol (PPP) in the remote access service (RAS) software of an operating system. It will be appreciated, however, that the system and method for distributed testing of the implementation of a remote access protocol is not limited to the PPP, but may be used to test other remote access protocols, such as the SLIP. Moreover, the system and method can be used to test the implementation of a given remote access protocol in network servers as well as in network clients.

In the embodiment of FIG. 2, the testing system 70 is designed to employ multiple test controllers. For illustration purposes, two test controllers 72 and 74 are shown in FIG. 2. It will be appreciated, however, that more than two test controllers or a single test controller may exist in the testing system at a given time. Similarly, the server pool 76 may include one or more servers, and the client pool 78 may also include one or more clients.

In this distributed testing system, the test controllers, servers and clients are not required to be (although they may be) on dedicated computers for testing the protocol implementation and may dynamically join and leave the testing system. This ability to dynamically add or remove computers to or from the testing system provides significant flexibility and efficiency in computer usage. For instance, the computers acting as test controllers, servers, and clients can be used for other purposes such as program development and data processing during regular work hours, and are allowed to participate in the testing when they become available after the work hours.

Besides the test controllers, servers, and clients, the testing system in the embodiment of FIG. 2 includes further components such as a database 90 for keeping track of all test cases and its associated database manager 94, various database utilities (e.g., the bulk copy engine 96 and a database scavenger 98), a policy manager 100, a reporter component 102, and a monitor component 104. The functions and operations of these components are described in greater detail below.

Turning first to the test controllers 72 and 74, each test controller is responsible for pairing clients up with servers and, for each server-client pair, assigning a selected set of test cases to be executed by the pair. It also interacts with the database manager 94 to manage the database 90 and to post test results back to the database 90. The reporter component 102 uses the test status and results to generate reports. The monitor component 104, on the other hand, uses the test status and results to provide one or more user interface screens for a user 106 overseeing the testing to see what is happening across all the servers and clients and the progress of the testing.

When a test controller 72 starts, it registers its testing-related information with the database 90. The test controller 72 also updates the testing-related information as the testing progresses, such as at pre-selected intervals. The testing-related information includes, for example, the test controller's identification ("ID"), IP address, and machine name, all the clients connected to a named pipe, server connection information, the mechanism for communicating with the monitor component, the number of clients currently connected, the number of servers currently connected, and data representing its current state. The numbers of connected servers and clients are zero when the test controller starts. As described in greater detail below, the test controller information is useful for balancing the workload of different instances of test controllers participating in the testing, which may be running on the same or different machines.

To keep track of the test cases to be executed for testing the protocol implementation and to monitor the progress of the testing, the database 90 maintains a matrix 110 of the test cases (i.e., the server-client configuration combinations) to be executed. The term "matrix" is used herein because each test case is defined by both a server configuration and a client configuration. It will be appreciated that the number of all test cases tracked in the database can be vary large, and in the particular case of the PPP testing can be more than ten millions. It will also be appreciated that the database does not have to be exhaustive in its collection of test cases and may contain only a selected portion of all the possible combinations.

Figure 3:
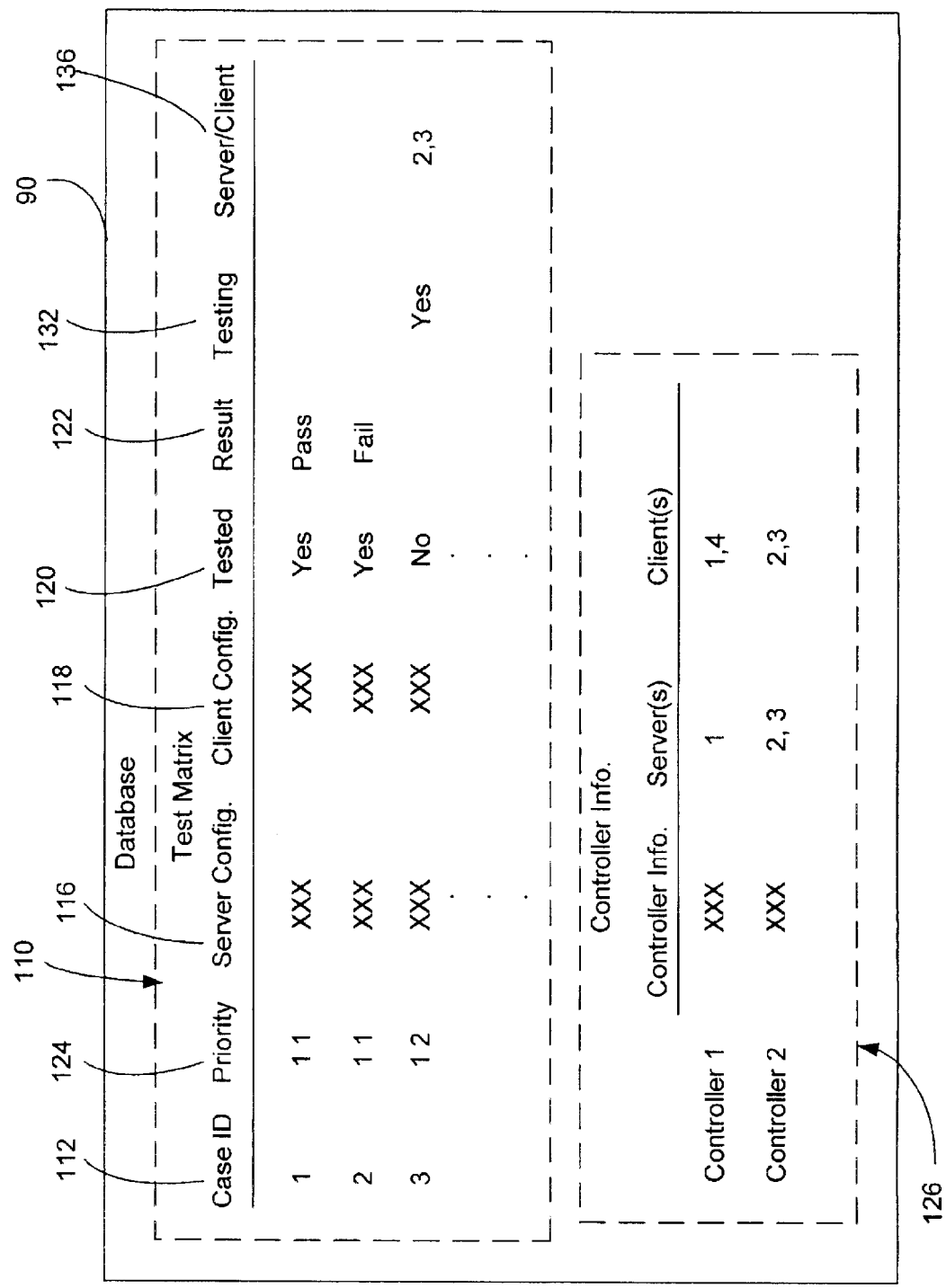
FIG. 3 is a schematic diagram showing a database for storing a plurality of test cases to be executed for testing the implementation of a network connection protocol in the test system of FIG. 2.
Figure 4:
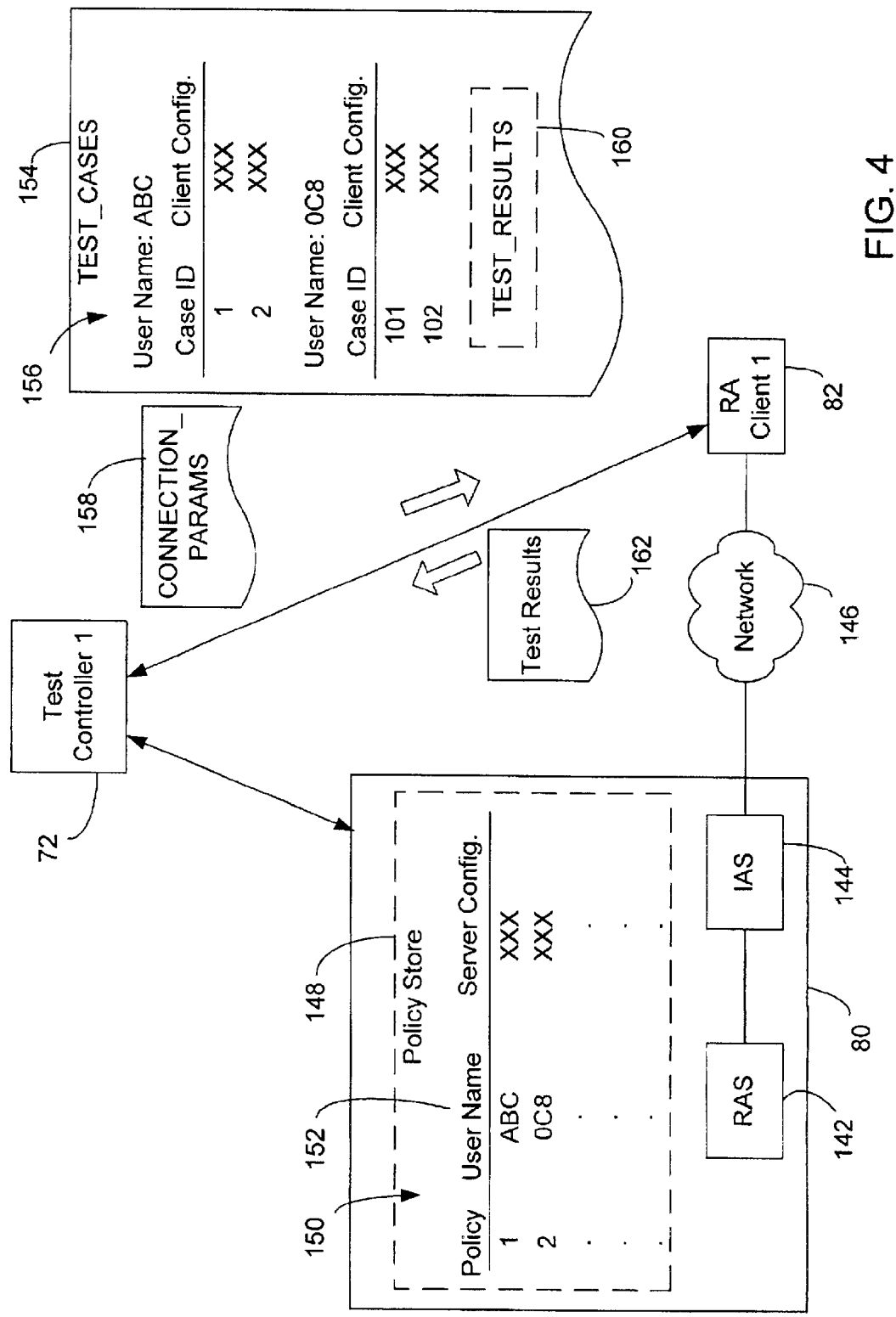
FIG. 4 is a schematic diagram showing a server-client pair for executing assigned test cases.

As shown in FIG. 3, to facilitate tracking, each test case in the database is identified by a unique case identification (ID) 112. With each test case ID, the database stores a server configuration 116 and client configuration 118. The database also stores test status data 120 indicating whether that test case has been tested and, if the test case has been tested, test result data 122 indicating whether a connection attempt based on the server and client configurations of that test case has succeeded or failed. Test cases that are currently assigned to a server-client pair for testing are identified by the "testing" flags 132 to be "active." For each active test case, the database preferably also stores data 136 that identify the server and the client to which the active test cases are assigned.

In accordance with a feature of the embodiment, each of the test cases has also a priority indicator 124 that indicates a priority level assigned to that test case. As will be described in greater detail below, the priority data of the test cases allow the testing system to prioritize the test cases such that test cases with higher priorities can be selected for testing first. There are many different ways that may be used to indicate the priority of a test case. By way of example, in one implementation as illustrated, the priority indicator for a test case has two digits. The first digit indicates a priority value that depends on one or more attributes of the server configuration for that test case, and the second digit indicates a priority value that depends on attributes of the client configuration. The priority values of the test cases may be set, for example, by using a filter.

The assignment of priority values can be based on various criteria preferably set according to the actual needs of the testing. For example, if the short-term goal is to test connections over media such as the modem or PPTP, all the test cases with both the server and client set to use the modem or PPTP can be assigned a priority index of (1,1). It will be appreciated that how exactly the priorities of the test cases are assigned and used in selecting test cases is not critical to the invention. It will also be appreciated that the tabular listing of the test cases as schematically shown in FIG. 3 is only for illustration purposes, and the database may be implemented in many different ways using different database structures and record formats.

Returning now to FIG. 2, the database manager 94 is used to control the access to the test cases maintained in the database 90. In one implementation, the database manager 94 is a dynamic link library (DLL) that provides methods and application programming interface (API) functions for use by the test controllers and various other tools, such as the reporter 102 and the monitor 104, to interact with the database 90. The different APIs provided by the database manager provide the functionality of, for instance, retrieving and locking test cases in the database that are active (i.e., being currently assigned for testing), updating the test result data of the test cases, unlocking the test cases after they have been tested, maintaining the priority indicators of the test case, etc. The database manager 94 also maintains controller information records 126 (FIG. 3) in the database 90, which, as described above, include data indicating which servers and clients are controlled by each test controller.

In addition to the database manager 94, other database utilities may be provided to facilitate interaction with the database. Some of the utilities may use the API's exported by the database manager 94, while others may interact with the database 90 directly. For example, in one implementation, two database utilities are provided: a bulk copy engine 96 and a database scavenger 98. The main purpose of the bulk copy engine 96 is to provide a fast, robust, and easy-to-use means for populating the database 90 with a large number of test cases. It reads the text files 108, which contain data specifying the server and client configurations of the test cases to be loaded into the database, and updates the database 90 by adding the test cases in bulk. The database scavenger 98 is used to go through the database 90 and report inconsistencies, cross table discrepancies, detailed failure information for failed test cases, test cases not executed for a long time, the percentage of test cases of different priority levels not executed in the present month, etc.

The monitor 104 is a graphic user interface program that allows a user 106 to monitor the status of the testing. To that end, the monitor 104 reads information from the database 90 through the database manager 94 and provides textual or graphic presentations of the testing status on a display 128. The user interface provided by the monitor preferably allows the user to view all the client-server pairs currently participating in the testing and the test controllers controlling them, the test cases being executed by each server-client pair, and which of those test cases have been executed. Error conditions may also be presented to allow the user to take immediate corrective actions. It will be appreciated that the exact contents and formats of the presentation provided by the monitor may be adjusted as needed and are not critical to the invention.

The reporter component 102 is a tool that is responsible for providing one or more types of reports, such as a daily report for functional progression analyses of the testing. It interacts with the test controllers and the file logs created by the test controllers to generate the daily report. The daily report may include, for example, statistics regarding test cases of different priority levels executed overnight, the pass rate and failure rate of the executed cases, the numbers of clients and servers used, etc. The types of reports generated by the reporter component 102 may be tailored to suit the needs of the tester and are not critical to the invention.

When a server 80 joins the server pool 76, it queries the database 90 to retrieve the list of available test controllers. The server 80 tries to connect to the test controller that is servicing the least number of server-client pairs as indicated by the test controller information maintained by the database. This selection helps to balance the workloads of the test controllers. If the connection to the test controller with the least number of server-client pairs is not successful for some reasons, the server then tries to connect to the next lightly loaded test controller. After it is connected to a test controller 72, the server 80 registers with the test controller by sending its configuration capabilities to the test controller. The term "configuration capabilities" is used broadly here to indicate the various ways the server can be configured, including configuration attributes that can be dynamically changed, such as the selected authentication protocol, as well as those that cannot be readily changed, such as the types of connection media the client supports. In one embodiment, to facilitate the prioritization of testing, the server may also indicate to the test controller the type or types of test cases it intends to test. For example, the server may indicate that it should be used for testing test cases concerning authentication and encryption or test cases concerning the callback feature.

In one implementation, after a server 80 registers with the test controller 72, the test controller obtains from the database a set of test cases to be tested by this server. The test cases are selected based on the configuration capabilities of the server, and may be based on other factors such as the priorities of the test cases, the types of test cases the server indicated that it intends to test, etc. The various server configurations for the selected test cases are then given to the server. During the testing, the server will assume those server configurations as it works together with one or more clients paired up with it to go through the test cases. The aspect of providing the different server configurations to the server for testing will be described in greater detail below.

Similar to the server registration, a client 82 joining the client pool 78 queries the database 90 to retrieve the list of test controllers and tries to connect to an available test controller with the lightest load. After connecting to a test controller 72, the client 82 registers with the test controller by sending its configuration capability information to the test controller. The client may also indicate to the test controller the type or types of test cases it intends to test.

Based on the information received from the client 82, the test controller 72 matches the client with an active server registered with it, such as the server 80. Generally, the matching of a registered client with a registered server involves the consideration of the server-client compatibility and other factors. For instance, the test controller tries to match the client with a server that has been assigned the type of test cases identified by the client as the type it intends to test. In other words, if the client wants to execute a certain type of test cases, the server paired up with it should be configured for those test cases. Also, the server should support the network protocols and media the client wants to test. For example, if the client wants to test connectivity using the IP and a modem, the server should support IP and modem. Moreover, at a given time, a server may be paired with more than one client. For load balancing purposes, if two or more servers are available and compatible with the client, the client may be matched with the server currently paired up with the least number of clients.

In one embodiment, a filter 138 in the test controller 72 may be set to specify the type of test cases the test controller should try to run over a given period. To that end, the monitor 104 may be used by a user 106 to communicate with the test controller 72 to modify the filter dynamically. For example, on weekends the filter 138 may be set to run test cases assigned with the highest priority. As another example, it may be desired to run test cases that use the Challenge-Handshake Authentication Protocol (CHAP), and the filter may be set so that CHAP-related test cases are run before the regular testing commences. Alternatively, a set of servers may be selected to run test cases relating to the CHAP while the other servers continue to run test cases selected in the regular way.

For each server-client pair, selected test cases are assigned to the pair for execution. As mentioned above, in one implementation, test cases are selected from the database 90 and assigned to the server at the time the server registers with the test controller. To that end, the test controller 72 passes the configuration capability information and test type of the server to the database manager 94. The server information is stored in a "srvinfo" table in the database 90. The test controller requests the database manager to retrieve a set of test cases for testing by that server. In response, the database manager 94 matches the configuration capabilities and test type of the server as stored in the srvinfo table with untested and unassigned test cases in the matrix. For example, if the server does not support the CHAP, the database manager 94 will not select test cases that require the server to be configured to use the CHAP for authentication. As another example, if the server information indicates that the server contains modem as the preferred media, the database manager may query the database for untested test cases that have the connection medium set to modem. The selection of the test cases may also be based on the priority settings 120 of the test cases. Thus, for example, test cases with the priority index of (1,1) may be selected for testing first if they match the configuration capabilities of the server. The database manager then sends the test cases selected for the server back to the test controller.

The different server configurations for the test cases selected for the server 80 are then identified to the server. In the illustrated embodiment, each variation of the server configurations for the selected test cases is specified to the server 80 as a user access policy. Referring now to FIG. 4, the server 80 includes not only the remote access service (RAS) component 142 but also an Internet Authentication Service (IAS) 144, and the communications between the RAS and the network 146 go through the IAS. The IAS maintains in a policy store 148 a plurality of user-specific access policies. In accordance with a feature of the embodiment, an access policy 150 can be used to specify a particular configuration the server 80 should assume for responding to a call made under a specific user name to establish a connection under the PPP. For purposes of PPP testing, the server loads a plurality of access policies, each corresponding to one of the variations of the server configuration for the test cases assigned to the server. Each policy is identified by a unique user name 152 under which a client paired up with the server will call in to establish a connection. Thus, when a client 82 calls in under a certain user name in attempt to form a connection, the server retrieves the policy corresponding to that user name, assumes the server configuration specified in that policy, and handles the connection request under the PPP accordingly.

The loading of the access policies 150 onto the RA server 80 for the assigned test cases is by means of the policy manager 100, which is implemented as a DLL routine. After the database manager 94 has selected a set of test cases for the server in response to the request of the test controller 72, the configuration data for forming access policies to be loaded onto the server 80 are passed to a helper DLL routine. The task of the helper DLL routine is to get the identifications of the test cases, fetch the corresponding configuration data from the database, and generate simple initialization files (files with the ".ini" extension) that contains the access policies generated for the selected test cases. The helper DLL routine saves the .ini files at a well-known location and sends a message to the test controller 72 indicating that the .ini files are ready. The test controller 72 then sends an appropriate message to the server 80 to instruct the server to load the access policies. The server then uses the policy manager 100 to load the policies in the .ini files and to return a success/failure result of the policy loading operation to the test controller. If the policies are successfully loaded, the test controller 72 asks the database manager 94 to lock the corresponding test cases as being currently assigned for testing by setting the "testing" flag of each of the test cases involved.

On the client side, after the client 82 registers with the test controller, the test controller pairs the client up with the server 80, and selects test cases for testing by this server-client pair. The test cases assigned to the server/client pair are a subset of the test cases assigned to the server. For instance, the test cases for the pair may correspond to one (or more) of the user access policies 150 set up by the server 80 as described above. The test cases selected for the server/client pair are then specified to the client, together with the user name the client should use when it makes a call to the server. To that end, the client 82 is given two data structures. One data structure 154 named TEST_CASES contains the list 156 of test cases assigned to it. The second data structure 158 named CONNECTION_PARAMS contains information required for the client to connect to the server, such as the parameters for the remote access dialing operation. In the TEST_CASES data structure 154, each test case is identified by its unique case ID and is associated with a user name that the client should use to make a connection attempt with the server for the test cases.

The client 82 then interacts with the server 80 to go through each of the test cases given to it. For each test case, the client assumes the client configuration of the test case and calls the server under the user name specified for that test case. When the server receives the call from the client, it assumes the server configuration specified in the access policy for that user name under which the client calls in. The process of establishing a connection between the server and the client is then carried out pursuant to the PPP. Whether the attempt by the client to connect to the server should succeed or fail should be determine by the client and server configuration combination of the test case. If a connection should be established but actually is not formed, or the connection should not be formed but actually goes through, the test case is marked as failed. After the execution of each test case, the client writes the pass/fail result of the test case in a TEST_RESULT substructure 160 of the data structure 154.

After the client 82 has finished all the test cases in the list, it returns the data structure 154 in a test result message 162 to the test controller 72, which then uses the database manager 94 to write the test result data into the database 90. The test controller may then give to the client new test cases, such as test cases corresponding to a different user access policy of the server, which in turn corresponds to a different subset of test cases assigned to the server. The test controller may also match the client to a different server for testing other test cases assigned to that server. Once the server has tested all the test cases assigned to it, the test controller may obtains another set of test cases from the database for the server, which will set up new user access policies according to the test cases. The server is then paired up with one of the registered clients for further testing. In this way, the test cases in the database 90 are executed by multiple servers and clients in a distributed, automated, and controlled manner.

It can be seen that each server-client pair can be used to test many test cases. By way of example, if the server is loaded with 50 access policies corresponding to 50 different server configuration variations and the client is given test cases corresponding to 40 client configuration variations to go through, then a total of 2000 test cases may be executed by that server-client pair. It will be appreciated that a server may be paired up with more than one client (and, vice versa, a client with more than one server) at a given time. For instance, in the example given above, the same 50 client configurations may be given to multiple clients, but each client is instructed to make connection attempts to the server under a different user name corresponding to one of the 50 access policies loaded on the server.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

What is claimed is:

1. A computer-readable medium having computer-executable instructions for performing steps for distributed testing of an implementation of a remote access protocol, comprising:

registering a server intending to participate in the distributed testing, including receiving data identifying configuration capabilities of the server;

registering a client intending to in the distributed testing, including receiving data identifying configuration capabilities of the client;

matching the server and the client based on the configuration capabilities of the server and the client;

assigning a plurality of test cases corresponding to different combinations of server and client configurations to the server and the client for execution thereby, wherein for each assigned test case the client assumes the client configuration of said each assigned test case and initiates a call to the server in attempt to establish a connection under the remote access protocol, and the server assumes the server configuration of said each assigned test case and responds to the call of the client; and receiving test results for the assigned test cases executed by the server and the client.

2. A computer-readable medium as in claim 1, wherein the remote access protocol is the Point-to-point Protocol.

3. A computer-readable medium as in claim 1, having further computer-executable instructions for maintaining in a database a plurality of test cases corresponding to a matrix of server-client configurations to be executed for testing the implementation of the remote access protocol, and wherein the step of assigning includes selecting test cases from the database for execution by the server and client.

4. A computer-readable medium as in claim 3, wherein the step of assigning includes selecting test cases from the database for the server and the client based on the configuration capabilities of the server and the client.

5. A computer-readable medium as in claim 4, wherein each test case in the database includes a priority index, and wherein the step of assigning includes selecting test cases from the database based on the priority indices of the test cases.

6. A computer-readable medium as in claim 3, wherein the test cases in the database includes active test cases, and wherein the database includes data for each active test case identifying a server and a client to which said each active test case is assigned.

7. A computer-readable medium as in claim 3, further including computer-executable components including a bulk copy engine for populating the database with test cases.

8. A computer-readable medium as in claim 1, wherein the step of assigning test cases includes loading a plurality of access policies on the server, each of the plurality of access policies specifying a server configuration to be assumed by the server for executing a subset of the test cases selected for testing by the server.

9. A computer-readable medium as in claim 8, wherein said each access policy is associated with a given user name, and wherein the server assumes the server configuration specified by said each access policy in response to a call under the given user name for establishing a connection under the remote access protocol.

10. A computer-readable medium as in claim 9, further including computer-executable instructions for generating the access policies for the server according to the test cases selected for testing by the server.

11. A computer-readable medium as in claim 1, having computer-executable components including a monitor module for generating a user interface screen for presenting a test status and test results for viewing by a user.

12. A computer-readable medium as in claim 1, having computer-executable components including a reporter component for generating reports based on test results.

13. A system for distributed testing of an implementation of a remote access protocol, comprising:

a plurality of servers forming a server pool;

a plurality of clients forming a client pool; and at least one test controller, the test controller programmed for registering a server in the server pool including receiving data identifying configuration capabilities of the server, registering a client from the client pool including receiving data identifying configuration capabilities of the client, matching the server and the client based on their respective configuration capabilities, assigning to the server and the client a plurality of test cases corresponding to different combinations of server and client configurations, and receiving test results for the assigned test cases executed by the server and the client, wherein for each assigned test case the client assumes the client configuration of said each assigned test case and initiates a call to the server in attempt to establish a connection under the remote access protocol, and the server assumes the server configuration of said each assigned test case and responds to the call of the client.

14. A system as in claim 13, wherein the remote access protocol is the Point-to-point Protocol.

15. A system as in claim 13, further including a database for maintaining a plurality of test cases to be executed for testing the implementation of the remote access protocol, wherein the test controller obtains the test cases assigned to the server and client from the database.

16. A system as in claim 15, further including a bulk copy engine for populating the database with test cases.

17. A system as in claim 15, wherein the test cases assigned to the server and client are selected from the database based on the configuration capabilities of the server and client.

18. A system as in claim 17, wherein each test case in the database includes an assigned priority index.

19. A system as in claim 18, wherein the test cases assigned to the server and client are selected from the database based on their priority indices.

20. A system as in claim 13, wherein the test controller selects a first set of test cases for testing by the server after registering the server, and the test cases assigned to the server and the client for testing are a subset of the first set of test cases.

21. A system as in claim 20, wherein the server sets up a plurality of access policies for testing the first set of test cases, each of the access policies specifying a given user name and a server configuration corresponding to a subset of the first set of test cases, and wherein the server assumes the server configuration of said each access policy to respond to a call made under the given user name for establishing a connection under the remote access protocol.

22. A system as in claim 21, further including a policy generation component for generating the access policies for loading on the server for testing the first set of test cases.

23. A system as in claim 13, further including a monitor component for generating a user interface screen for presenting a test status and test results for viewing by a user.

24. A system as in claim 13, further including a reporter component for generating test reports based on the test results.

* * * * *